United States Patent
Roffe et al.

(10) Patent No.: US 11,933,357 B2
(45) Date of Patent: Mar. 19, 2024

(54) BEARING WITH INTEGRATED AXIAL PRELOAD AND METHOD THEREOF

(71) Applicant: Schaeffler Technologies AG & Co. KG, Herzogenaurach (DE)

(72) Inventors: Dennis Roffe, Fort Mill, SC (US);
Michael Heaton, Rock Hill, SC (US);
Guihui Zhong, Charlotte, NC (US);
James Brown, Rock Hill, SC (US);
Daniel Wuerdinger, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 476 days.

(21) Appl. No.: 17/348,829

(22) Filed: Jun. 16, 2021

(65) Prior Publication Data

US 2022/0403882 A1 Dec. 22, 2022

(51) Int. Cl.
*F16C 25/08* (2006.01)
*F16C 19/06* (2006.01)
*F16C 27/08* (2006.01)
*F16C 35/077* (2006.01)

(52) U.S. Cl.
CPC ............ *F16C 25/083* (2013.01); *F16C 19/06* (2013.01); *F16C 27/08* (2013.01); *F16C 35/077* (2013.01); *F16C 2229/00* (2013.01)

(58) Field of Classification Search
CPC ........ F16C 19/06; F16C 25/083; F16C 27/08; F16C 35/04; F16C 35/042; F16C 35/045; F16C 35/047; F16C 35/077; F16C 2229/00
See application file for complete search history.

(56) References Cited

U.S. PATENT DOCUMENTS

| 2,044,380 A | * | 6/1936 | Cobb | F16C 25/083 384/488 |
| 3,552,338 A | * | 1/1971 | Graham | F16C 25/083 112/270 |
| 5,624,193 A | * | 4/1997 | Vogelsberger | F16C 25/083 384/517 |
| 2004/0020743 A1 | | 2/2004 | Dittmer et al. | |
| 2009/0121570 A1 | * | 5/2009 | Nishikawa | H02K 5/1732 310/90 |
| 2011/0188797 A1 | | 8/2011 | Arnault | |

(Continued)

FOREIGN PATENT DOCUMENTS

| EP | 2508768 A1 * 10/2012 | ............ F16C 25/083 |
| JP | 2008175337 A * 7/2008 | |

(Continued)

*Primary Examiner* — Phillip A Johnson
(74) *Attorney, Agent, or Firm* — Volpe Koenig

(57) ABSTRACT

A bearing, including: an inner ring defining a first groove; an outer ring including a radially inner surface, the radially inner surface facing an axis of rotation of the bearing and defining a second groove and a third groove; a cage radially disposed between the inner ring and the outer ring; a plurality of balls retained by the cage, and disposed in the first groove, and in the second groove; and a preloaded resilient washer assembly including a rigid washer and a resilient washer including a radially outermost surface disposed in the third groove. The resilient washer urges the rigid washer away from the outer ring in an axial direction parallel to an axis of rotation of the bearing.

20 Claims, 11 Drawing Sheets

(56) References Cited

U.S. PATENT DOCUMENTS

2014/0184004 A1    7/2014    Yamaguchi
2019/0032706 A1    1/2019    Isaji et al.

FOREIGN PATENT DOCUMENTS

| KR | 1020170110387 | | 10/2017 | | |
|---|---|---|---|---|---|
| WO | WO-2011122210 A1 | * | 10/2011 | ............ | F16C 19/184 |
| WO | WO-2014075669 A1 | * | 5/2014 | ............ | F16C 25/083 |
| WO | WO-2015043630 A1 | * | 4/2015 | ............ | F16C 25/083 |

* cited by examiner

BEARING WITH INTEGRATED AXIAL PRELOAD AND METHOD THEREOF

TECHNICAL FIELD

The present disclosure relates to a bearing with integrated axial preloading to prevent noise and vibration associated with changes in rotational torque, rotational direction, and/or axial loading associated with operation of the bearing.

BACKGROUND

Changes in rotational torque, rotational direction, and/or axial loading associated with operation of known bearings causes undesirable noise and vibration. To address the noise and vibration problem, it is known to perform additional steps, such as shimming, when the bearing is installed in an assembly, which increases the cost and complexity of using the bearing.

SUMMARY

According to aspects illustrated herein, there is provided a bearing, including: an inner ring defining a first groove; an outer ring including a radially inner surface, the radially inner surface facing an axis of rotation of the bearing and defining a second groove and a third groove; a cage radially disposed between the inner ring and the outer ring; a plurality of balls retained by the cage, and disposed in the first groove, and in the second groove; and a preloaded resilient washer assembly including a resilient washer including a radially outermost surface disposed in the third groove and a washer directly connected to the resilient washer.

According to aspects illustrated herein, there is provided a bearing, including: an inner ring defining a first groove; an outer ring including a radially inner surface, the radially inner surface facing an axis of rotation of the bearing and defining a second groove and a third groove; a cage radially disposed between the inner ring and the outer ring; a plurality of balls retained by the cage, and disposed in the first groove, and in the second groove; and a preloaded resilient washer assembly including a rigid washer and a resilient washer including a radially outermost surface disposed in the third groove. The resilient washer urges the rigid washer away from the outer ring in an axial direction parallel to an axis of rotation of the bearing.

According to aspects illustrated herein, there is provided a method of operating a bearing assembly, the bearing assembly including a housing, a bearing enclosed by the housing, the bearing including an inner ring defining a first groove and connected to a shaft, an outer ring connected to the housing and including a radially inner surface defining a second groove and a third groove, a cage radially disposed between the inner ring and the outer ring, a plurality of balls retained by the cage and disposed in the first groove and in the second groove, and a preloaded resilient washer assembly with a resilient washer including a radially outermost surface disposed in the third groove and a washer directly connected to the resilient washer and in contact with the housing. The method includes: urging, with the resilient washer, in a first axial direction parallel to an axis of rotation of the bearing, and with a first force, the outer ring away from the washer and the housing, and into contact with the plurality of balls; rotating the shaft and the inner ring, with respect to the housing, in a circumferential direction around an axis of rotation of the bearing; and displacing, with a second force, the outer ring in the first axial direction, and maintaining, with the preloaded resilient washer assembly, the contact of the outer ring with the plurality of balls, or displacing, with a second force, the outer ring in a second axial direction, opposite the first axial direction, and maintaining, with the preloaded resilient washer assembly, the contact of the outer ring with the plurality of balls.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
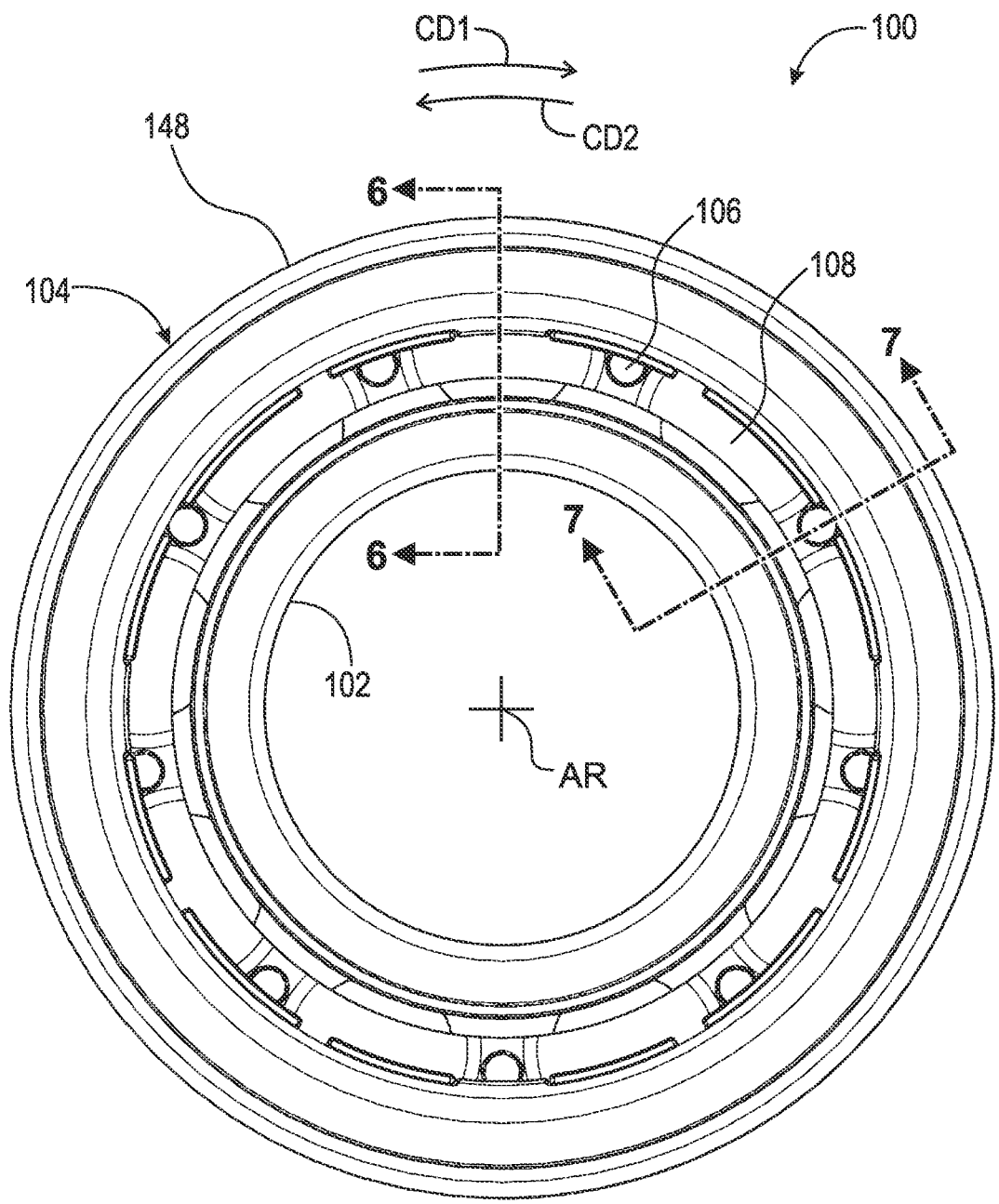
FIG. 1 is a front view of a bearing with an integrated axial preload.

FIG. 1 is a front view of bearing 100 with an integrated axial preload.

Figure 2:
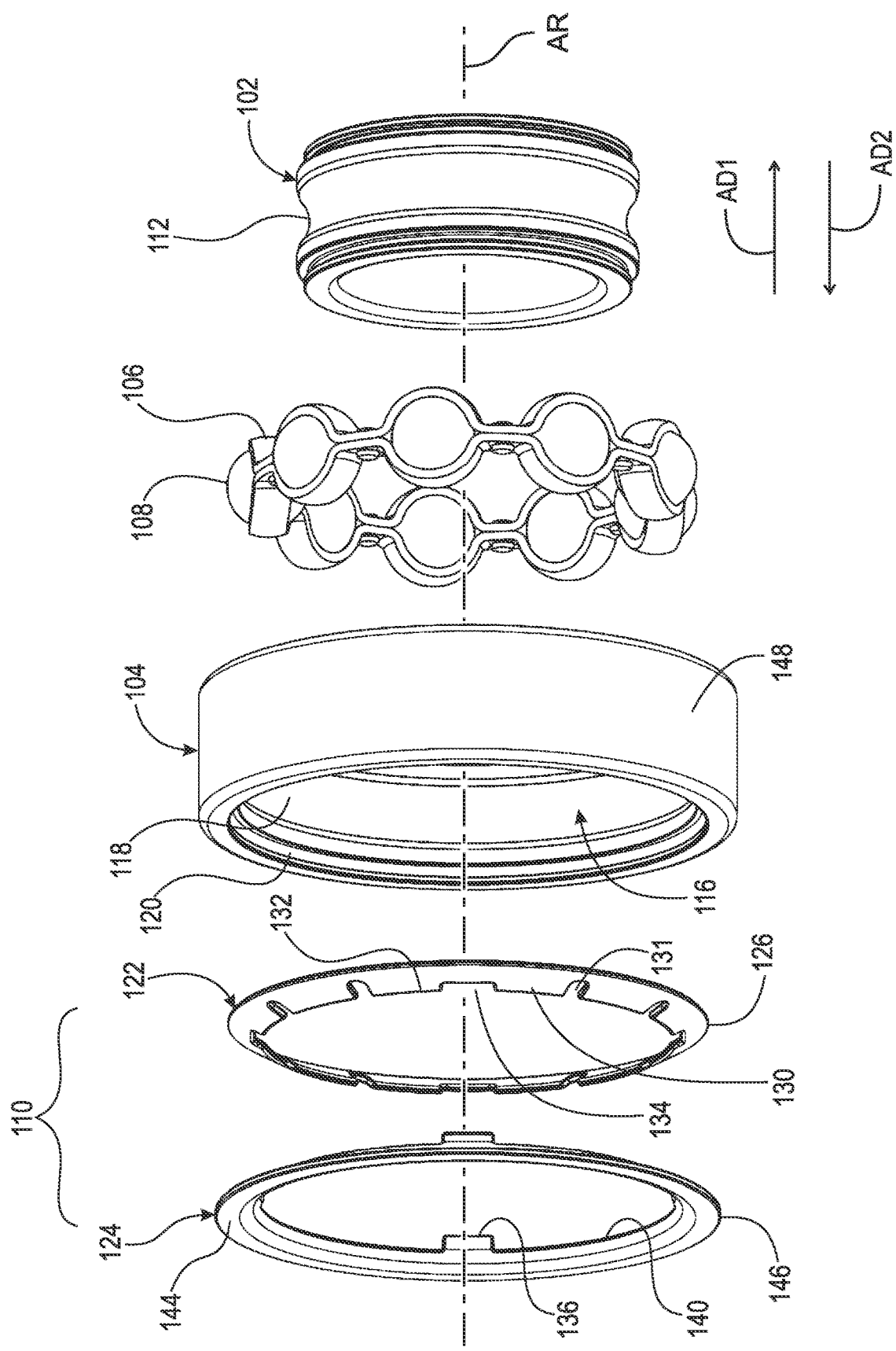
FIG. 2 is an exploded view of the bearing shown in FIG. 1.

FIG. 2 is an exploded view of bearing 100 shown in FIG. 1.

Figure 3:
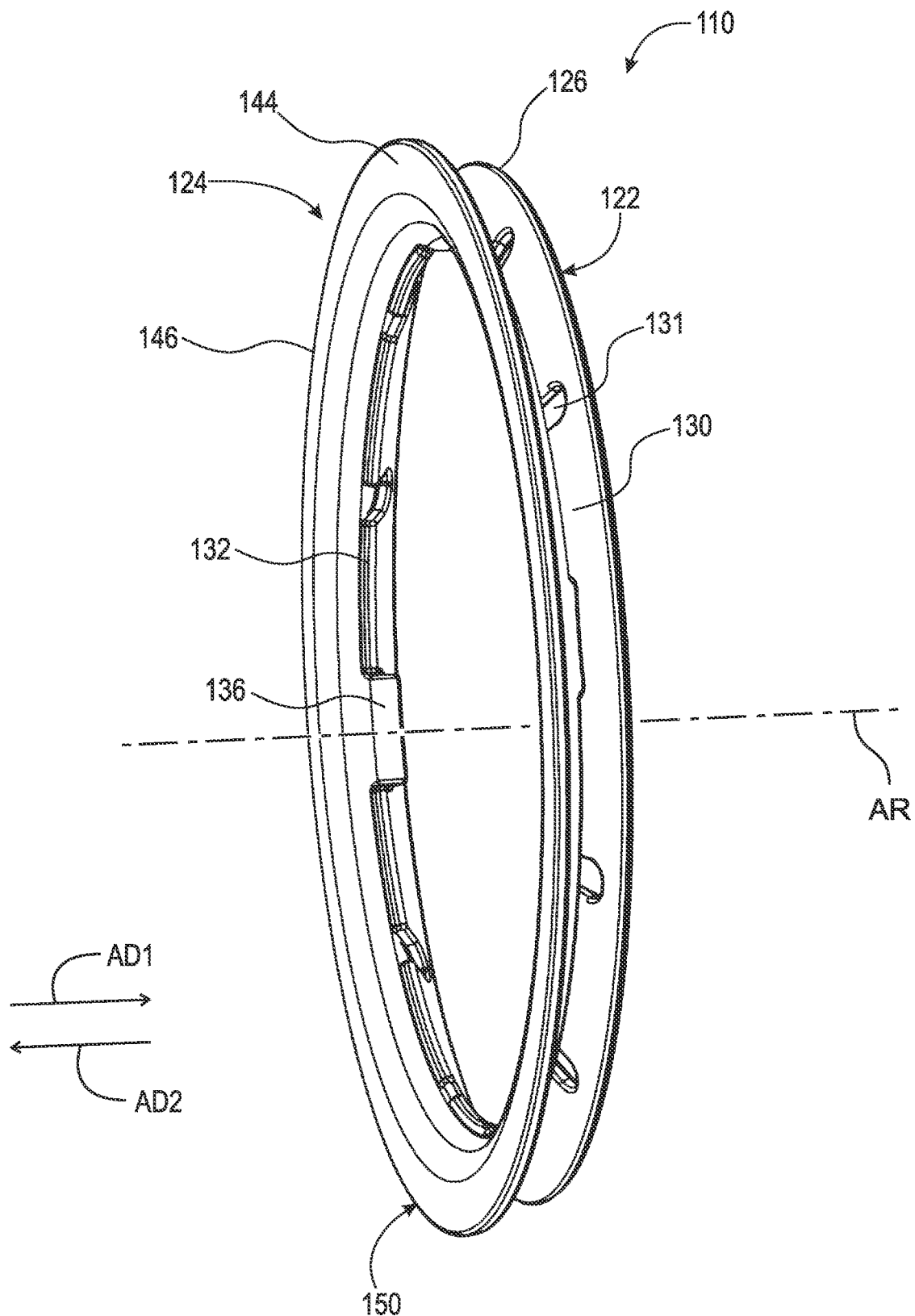
FIG. 3 is an isometric view of a preloaded resilient washer assembly shown in FIG. 2.

FIG. 3 is an isometric view of a preloaded resilient washer assembly shown in FIG. 2. The following should be viewed in light of FIGS. 1 through 3. Example bearing 100 includes: inner ring 102; outer ring 104; cage 106; balls 108; and preloaded resilient washer assembly 110. Inner ring 102 includes radially outer surface 112 facing away from axis of rotation AR of bearing 100 and defining circumferentially oriented groove 114. Outer ring 104 includes radially inner surface 116, facing axis of rotation AR and defining circumferentially oriented groove 118 and circumferentially oriented groove 120. Cage 106 is radially disposed between inner ring 102 and outer ring 104. Balls 108 are retained by cage 106, and are disposed in groove 114 and in the groove 118. Preloaded resilient washer assembly 110 includes resilient washer 122 and washer 124 directly connected to resilient washer 122. Resilient washer 122 includes radially outermost surface 126 disposed in circumferentially oriented groove 120. Resilient washer 122 urges washer 124 and outer ring 104 axially away from each other.

Figure 4:
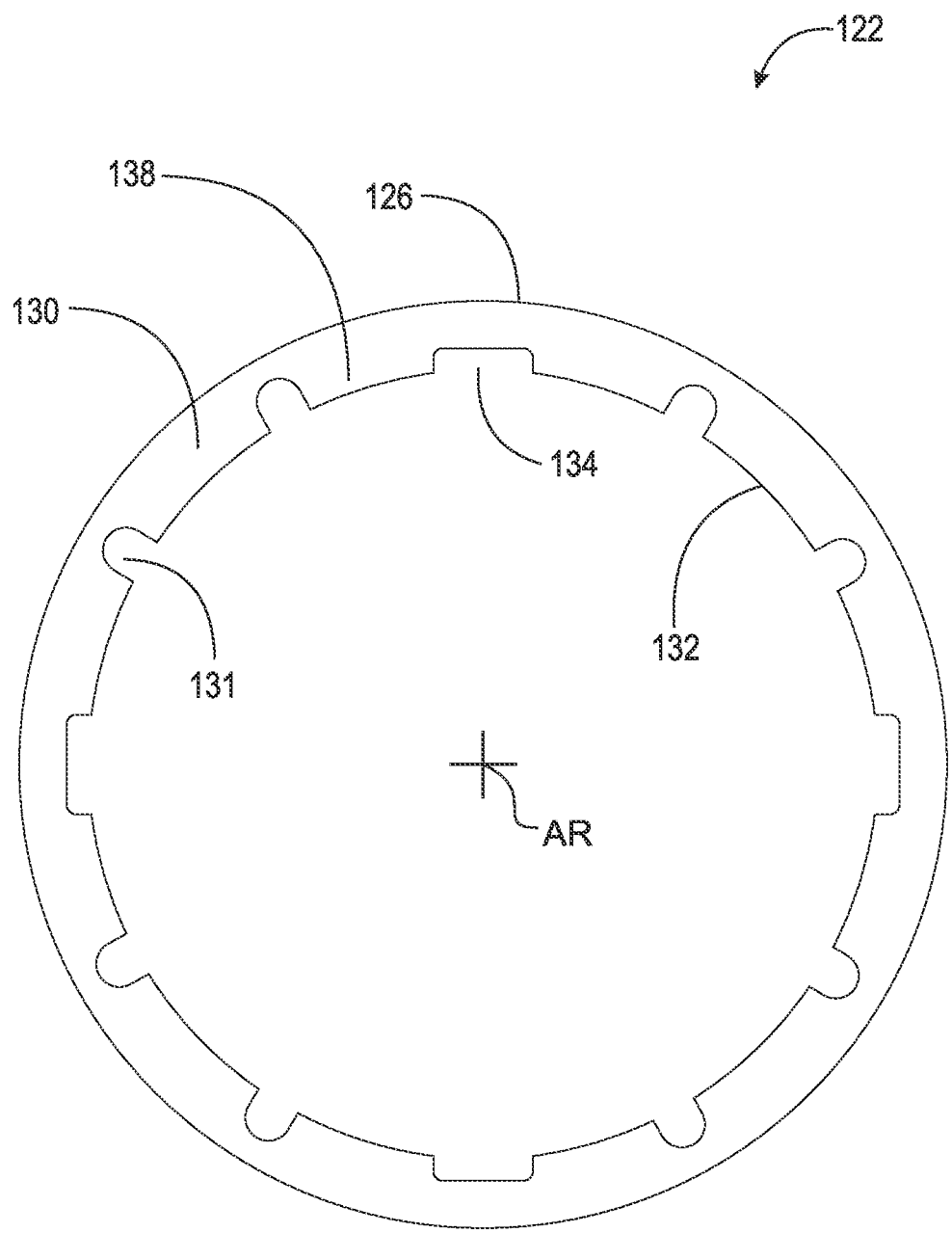
FIG. 4 is a back view of a resilient washer of the bearing shown in FIG. 1.

FIG. 4 is a back view of resilient washer 122 of bearing 100 shown in FIG. 1.

Figure 5:
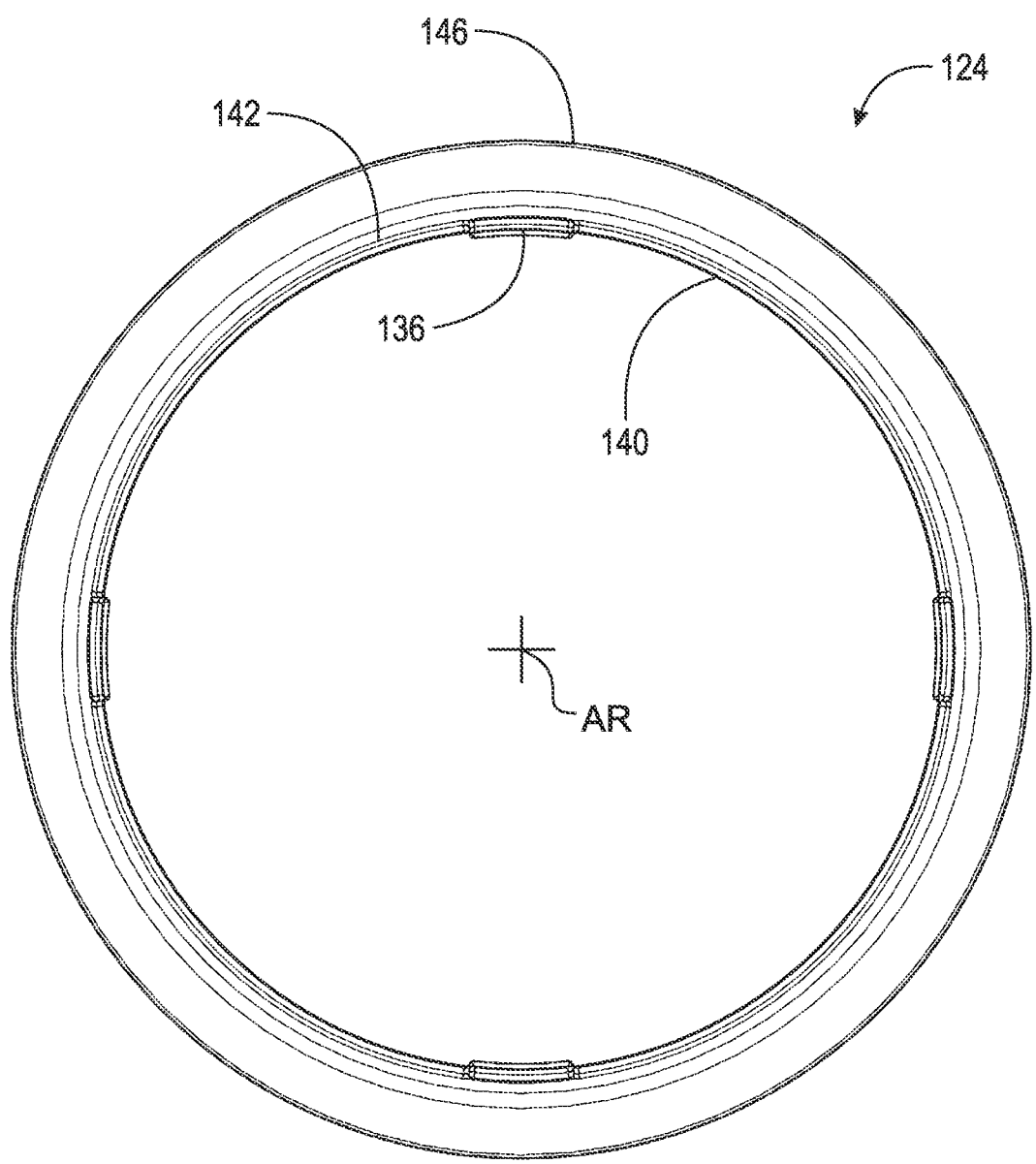
FIG. 5 is a front view of a washer of the bearing shown in FIG. 1.

FIG. 5 is a front view of washer 124 of bearing 100 shown in FIG. 1. The following should be viewed in light of FIGS. 1 through 5. In the example of FIG. 1, radially outermost surface 126 is circumferentially continuous. Resilient washer 122 includes resilient fingers 130 extending radially inwardly. Fingers 130 define radially outwardly extending notches 131 and include distal ends 132. Washer 122 defines radially outwardly extending indentations 134 bracketed by respective pairs of distal ends 132. Radially outermost surface 126 of resilient washer 122 is located further in axial direction AD1, parallel to axis of rotation AR, than distal ends 132.

Figure 6:
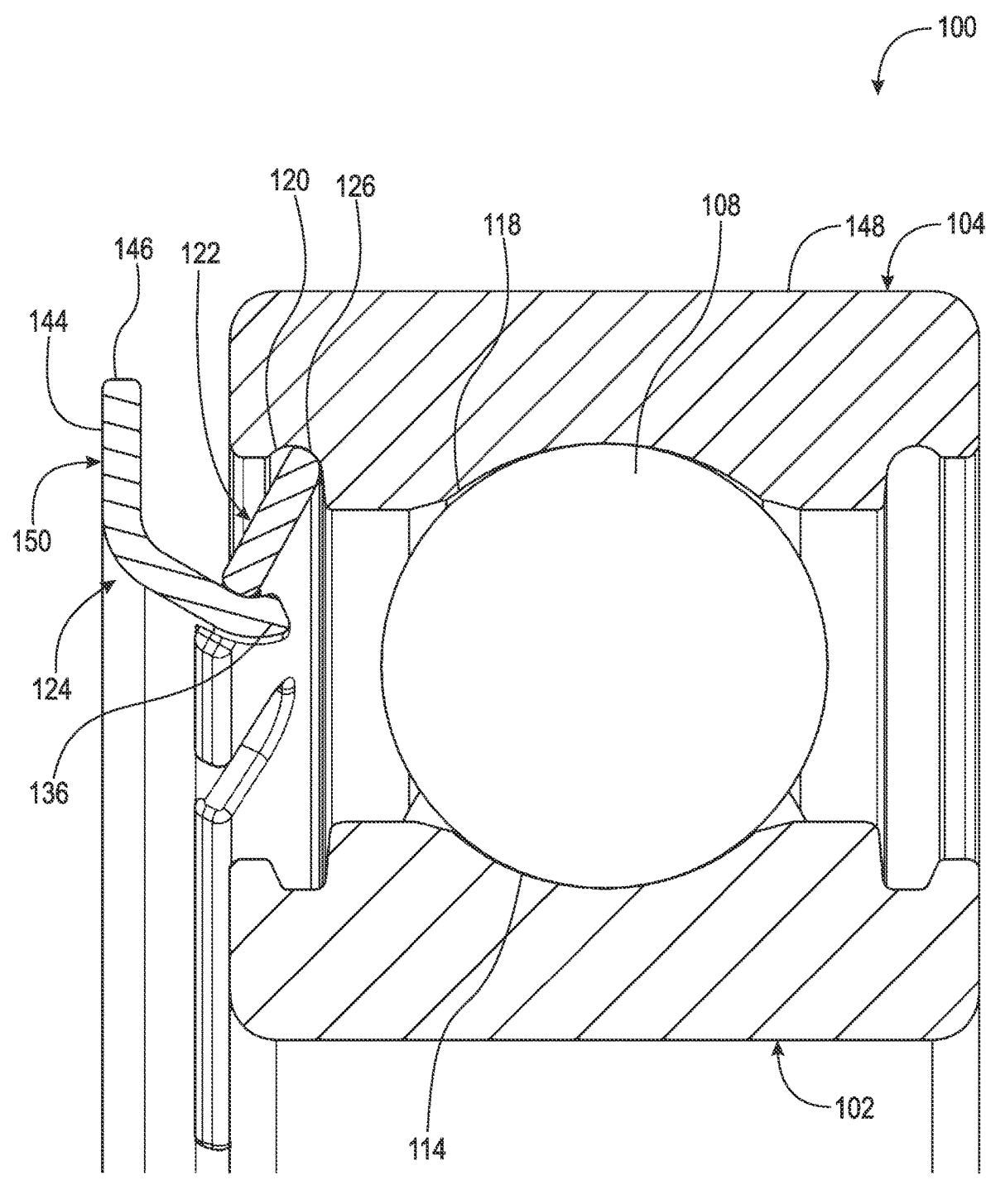
FIG. 6 is a cross-sectional view generally along line 6-6 in FIG. 1.
Figure 6:
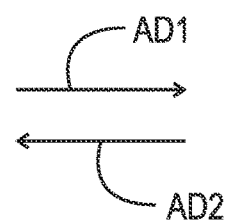

FIG. 6 is a cross-sectional view generally along line 6-6 in FIG. 1.

Figure 7:
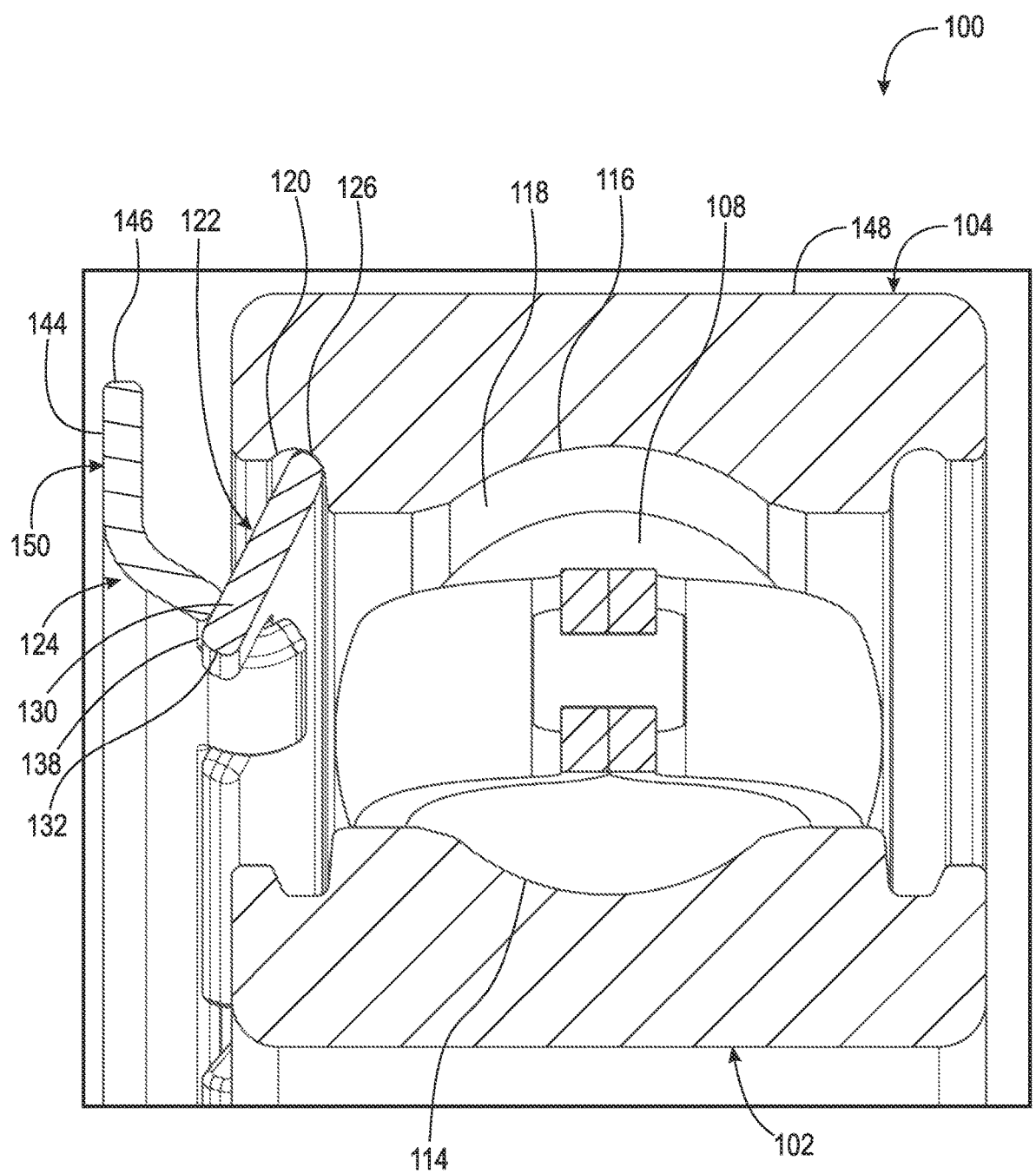
FIG. 7 is a cross-sectional view generally along line 7-7 in FIG. 1.

FIG. 7 is a cross-sectional view generally along line 7-7 in FIG. 1. The following should be viewed in light of FIGS. 1 through 7. Washer 124 includes axially extending tabs 136. In the example of FIG. 1: resilient washer 122 includes four indentations 134; and washer 124 includes four tabs 136. Tabs 136 are disposed in indentations 134 and non-rotatably connect resilient washer 122 and washer 124. Assembly 110 is not limited to a particular number of indentations 134 and tabs 136.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Fingers 130 include surface segments 138. Washer 124 includes radially innermost segments 140 and surface segments 142. Tabs 136 extend from segments 140 in direction AD1 and are circumferentially interleaved with segments 140. Surface segments 138 are in contact with surface segments 142. In the example of FIG. 1, a plurality of segments 138 are in contact with a respective segment 142.

Washer 124 includes annular surface 144, for example a planar surface, facing in axial direction AD2, opposite direction AD1. Surface 144 is arranged to contact a housing of a bearing assembly (see FIGS. 8 through 11). Resilient washer 122 is arranged to react against washer 124 to urge outer ring 104 away from the annular, planar surface 144, in direction AD1.

In the example of FIG. 1, radially outermost surface 146 of washer 124 is radially outward of radially outermost surface 126 of resilient washer 122. In the example of FIG. 1, washer 124 is free of contact with inner ring 102 and outer ring 104.

As noted above, operation of known bearings can result in undesirable noise and vibration. One source of this noise and vibration in known bearings is collisions between balls and rings of the bearing caused by a change of direction of torque applied to the bearing and/or by an axial load applied to the bearing. In particular, the relative axial positions of balls and rings of the bearing are not fixed, such that the change in torque direction and/or the axial load cause shifting of the balls and/or the rings with respect to each other, resulting in collisions between the balls and rings and subsequent noise and vibration. Bearing 100 resolves this problem by holding balls 108 and rings 102 and 104 in contact. In particular, when washer 124 is blocked in direction AD2 by a housing, as seen in FIGS. 5 through 8 below, resilient washer 122: urges outer ring 104 in direction AD1 to bring balls 108 into contact with inner ring 102 and outer ring 104; and maintains the contact, preventing relative displacement between balls 108 and inner ring 102 and outer ring 104.

Figure 8:
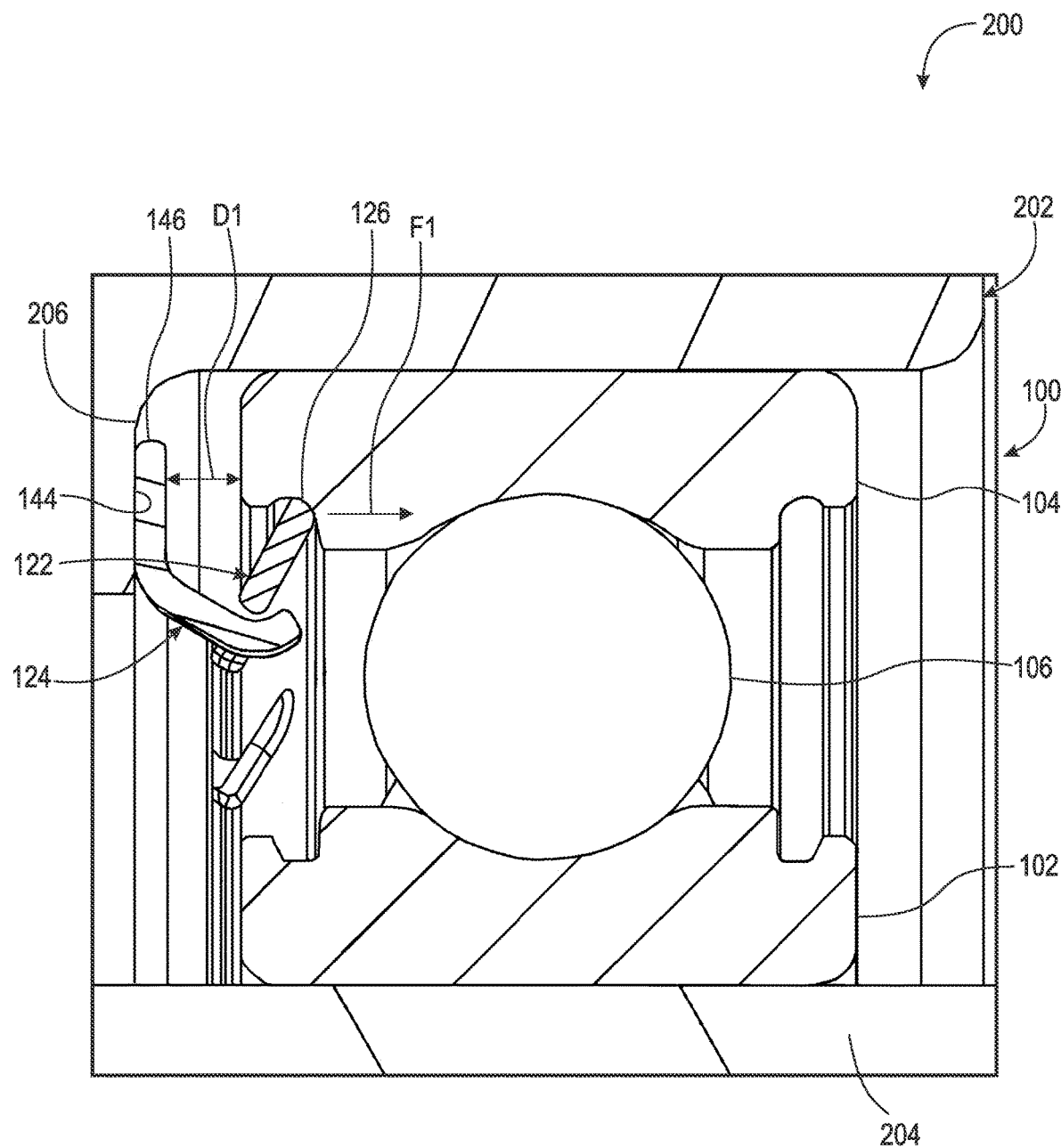
FIG. 8 is a cross-sectional view of a bearing assembly including the bearing shown in FIG. 1, with the bearing in an initial preloaded state.

FIG. 8 is a cross-sectional view of bearing assembly 200 including bearing 100 shown in FIG. 1, with bearing 100 in a neutral state (bearing 100 is preloaded by assembly 110, and is free of an external axial load). Bearing assembly 200 includes housing 202 and shaft 204. Shaft 204 is non-rotatably connected to inner ring 102. Bearing 100 is at least partially installed in and enclosed by housing 202. Outer ring 104 is connected to housing 202. Shaft 204 is arranged to receive rotational torque in one or both of circumferential CD1 and circumferential direction CD2, opposite direction CD1, around axis AR. Outer ring 104 is separated from washer 124 by distance D1 in direction AD1.

In FIG. 8, shaft 204 is not rotating, shaft 204 is free of an external axial load, and bearing 100 is preloaded in direction AD1 by assembly 110. As discussed below, from the preloaded position shown in FIG. 8, bearing 100 is able to respond to an axial load on shaft 204 in direction AD1 and to an axial load on shaft 204 in direction AD2. Resilient washer 122 urges washer 124 in direction AD2 to hold surface 142 of washer 124 in constant contact, under all axial loading conditions, with wall 206 of housing 202 facing direction AD1. Resilient washer 122 reacts against wall 206 and washer 124 to urge outer ring 104 in direction AD1 with force F1 to hold rings 102 and 104 in contact with balls 108. As noted above, holding rings 102 and 104 in contact with balls 108 prevents relative axial movement and collisions between balls 108 and rings 102 and 104 caused by axial loading of bearing 100. The axial loading can come from a change in magnitude of a rotational torque on shaft 204, a change of direction of rotational torque on shaft 204, and/or a change of an existing axial load on shaft 204, for example shifting a gear that is rotating shaft 204.

Figure 9:
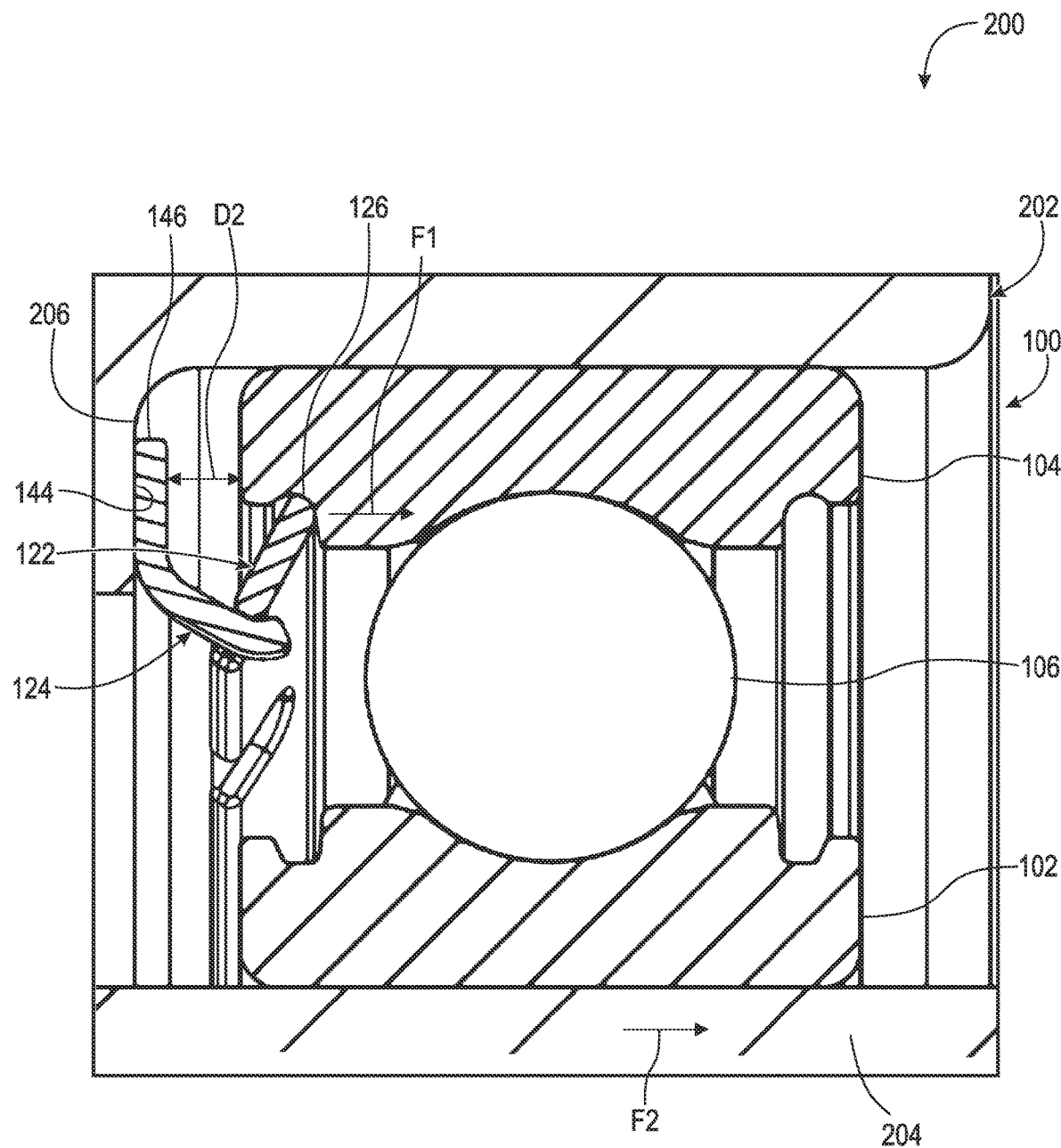
FIG. 9 is a cross-sectional view of the bearing assembly shown in FIG. 8 with the preloaded resilient washer assembly in an expanded state.

FIG. 9 is a cross-sectional view of bearing assembly 200 shown in FIG. 8 with assembly 110 in an expanded state. In the example of FIG. 9: an axial load with force F2 is applied to shaft 204, and hence bearing 100, in direction AD1. As ring 104 shifts in direction AD1 in response to force F2, resilient washer 122 reacts against wall 206 and washer 124 to expand in direction AD and displace ring 104 in direction AD1, maintaining contact of rings 102 and 104 with balls 108 during the displacement of ring 104. In the example of FIG. 9: distance D2, in direction AD1, between outer ring 104 and washer 124 is greater than distance D1 in FIG. 8.

Figure 10:
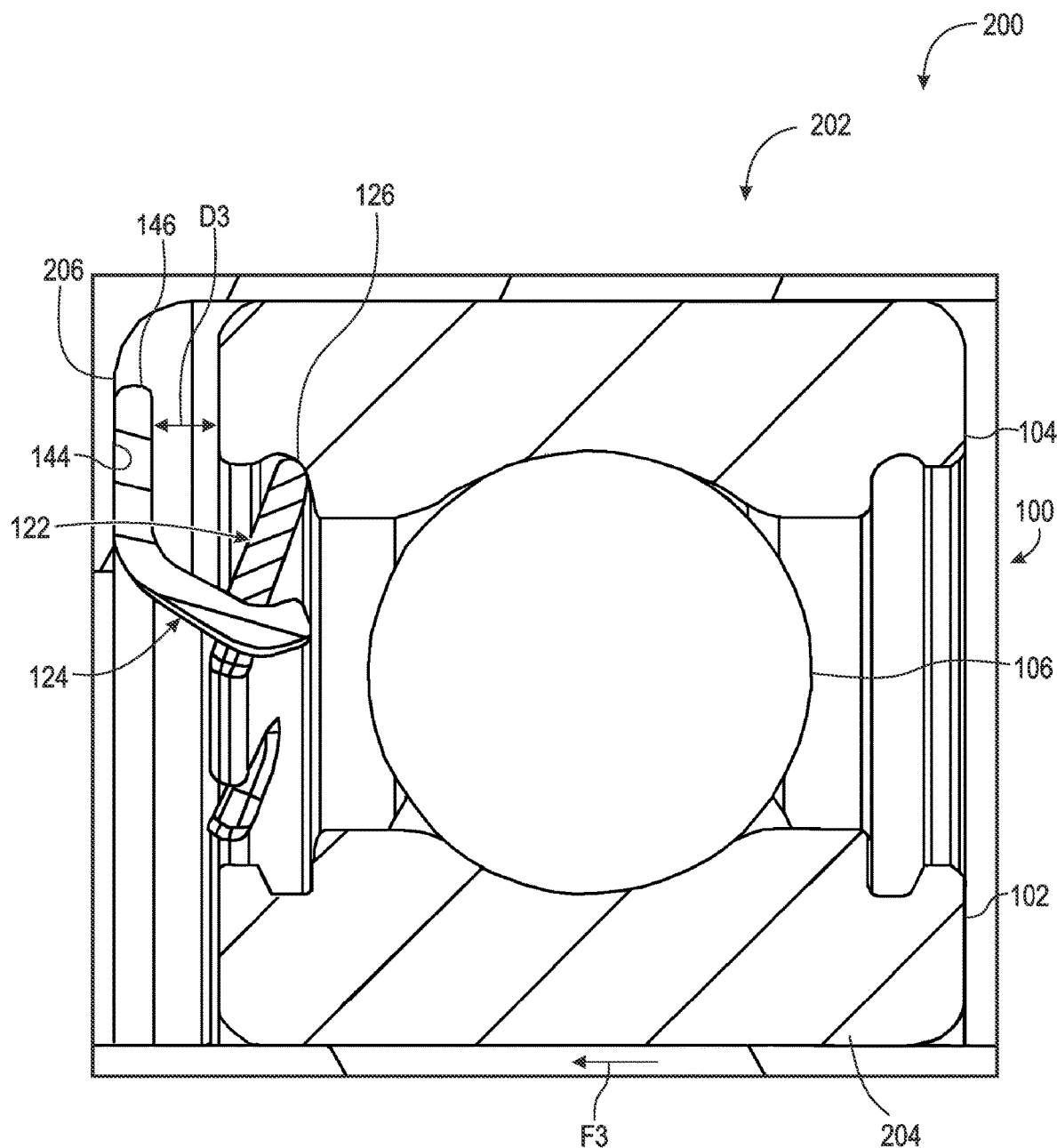
FIG. 10 is a cross-sectional view of the bearing assembly shown in FIG. 8 with the preloaded resilient washer assembly in a partially compressed state.

FIG. 10 is a cross-sectional view of bearing assembly 200 shown in FIG. 8 with resilient washer 122 in a partially compressed state. A second source of noise and vibration in known bearings is the collision of one of the rings of the bearing with a housing, in which the bearing is installed, in response to an axial load on the bearing. Bearing 100 prevents such collisions. In the example of FIG. 10, an axial load with force F3, less than force F1, is applied to shaft 204 and bearing 100 in direction AD2. Force F3 shifts ring 104 in direction AD2 to partially compress resilient washer 122. Resilient washer 122 continues to urge ring 104 in direction AD1, maintaining contact of rings 102 and 104 with balls 108 during the displacement of ring 104. Assembly 110 prevents outer ring 104 from colliding with washer 124 and housing 202. In the example of FIG. 10: distance D3, in direction AD1, between outer ring 104 and washer 124 is less than distance D1 in FIG. 8.

Figure 11:
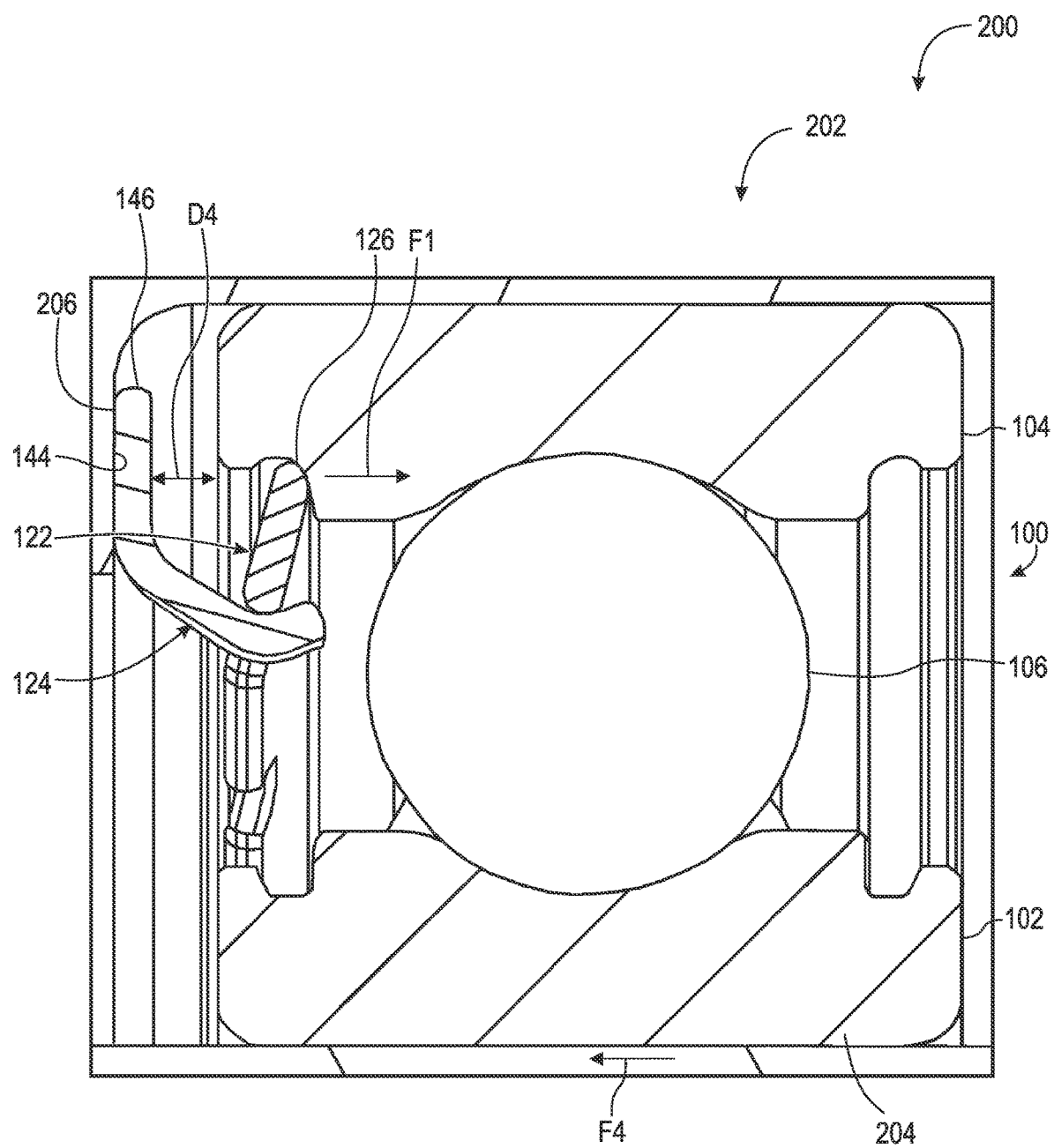
FIG. 11 is a cross-sectional view of the bearing assembly shown in FIG. 8 with the preloaded resilient washer assembly in a further compressed state.

FIG. 11 is a cross-sectional view of bearing assembly 200 shown in FIG. 8 with resilient washer 122 in a further compressed state. In the example of FIG. 11, an axial load with force F4, greater than force F1, is applied to shaft 204 and bearing 100 in direction AD2. Force F4 shifts ring 104 in direction AD2 to fully compress resilient washer 122. Resilient washer 122 continues to urge ring 104 in direction AD1, maintaining contact of rings 102 and 104 with balls 108 during the displacement of ring 104. In the example of FIG. 11: force F4 is the maximum expected axial force on shaft 204 in direction AD2. Resilient washer 122 is in its maximum compressed state and assembly 110 prevents outer ring 104 from colliding with washer 124 and housing 202. In the example of FIG. 11: distance D4, in direction AD1, between outer ring 104 and washer 124 is less than distance D3 in FIG. 10.

Washer 124 is non-rotatably connected to resilient washer 122; however, as seen in FIGS. 8 through 11, radially outermost surface 126 of washer 122 is axially displaceable as washer 122 reacts to the various axial loads imposed on bearing 100. For example, as axial loading on bearing 100 in direction AD2 increases, surface 126 displaces in direction AD2 toward radially outer portion 150 of washer 124.

In the event of a spike on shaft 204 greater than force F4, for example caused by operation of assembly 200 outside of design parameters, which would cause a catastrophic failure of resilient washer 122 and contact of outer ring 104 with washer 124, resilient washer 122 would still absorb a portion of the spike to minimize noise and vibration caused by the contact.

The following should be viewed in light of FIGS. 1 through 11. The following describes a method of preloading bearing assembly 200. Although the method is presented as a sequence of steps for clarity, no order should be inferred from the sequence unless explicitly stated. A first step urges, with resilient washer 122, washer 124 into contact with surface 206 of housing 202. A second step urges, with resilient washer 122 and with force F1, outer ring 104 in axial direction AD with respect to housing 202 and into contact with balls 108. A third step prevents washer 124 from contacting outer ring 104. A fourth step rotates shaft 204, with respect to the housing 202, in circumferential direction CD1 or circumferential direction CD2. A fifth step: displaces, with force F2, outer ring 104 in axial direction AD1; or displaces, with force F3, less than force F1, outer ring 104 in axial direction AD2; or displaces, with force F4, greater than force F1, outer ring 104 in axial direction AD2. A sixth step maintains, with resilient washer 122, contact of washer 124 with surface 206, and maintains, with resilient washer 122, contact of outer ring 104 with balls 108.

When the fifth step displaces, with force F2, outer ring 104 in axial direction AD1, the sixth step includes expanding resilient washer 122. When the fifth step displaces, with force F3, outer ring 104 in axial direction AD2, the sixth step includes compressing resilient washer 122. When the fifth step displaces, with force F4, outer ring 104 in axial direction AD2, the sixth step includes compressing resilient washer 122. When the sixth step includes compressing resilient washer 122, a seventh step prevents contact between outer ring 104 and washer 124.

Example bearing 100 is a deep groove ball bearing. However, it is understood that bearing 100 is not limited to a deep groove ball bearing and that other bearing configurations are possible for bearing 100 including, but not limited to: a cylindrical roller bearing; a tapered roller bearing; a needle roller bearing; and an angular contact ball bearing.

Bearing 100 and a method of using bearing 100 provide at least the following advantages:
1. Elimination or minimization of noise and vibration associated with operation of bearing 100.
2. Integrated preloading. No external components or steps, such as shimming, to address noise and vibration, are needed as part of installing bearing 100.
3. Groove 118 is in inner radial surface 116 of outer ring 104, not in radially outer load bearing surface 148 of outer ring 104. Thus, the durability and service life of bearing 100 are maximized.
4. Washer 124 can be made of steel with a cost-effective stamping and/or bending process, reducing cost and complexity of fabricating washer 124, while optimizing the durability of washer 124.
5. In general, a housing for a bearing is made of aluminum or other metal softer than the metal, such as steel, used to fabricate resilient washer 122. Fingers 130 flex and displace in response to axial loads on bearing 100. Radially outer portion 150 of washer 124 is pinned to wall 206 by resilient washer 122 and shields housing 202 from contact with resilient fingers 130, eliminating wear on housing 202 from resilient washer 122.
6. The stiffness of resilient washer 122, and hence the magnitude of force F1, can be tuned to match the load requirements of the intended application and provide optimal dampening.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD axial direction
AD2 axial direction
AR axis of rotation

CD1 circumferential direction
CD2 circumferential direction
D1 distance
D2 distance
D3 distance
D4 distance
100 bearing
102 inner ring
104 outer ring
106 cage
108 ball
110 preloaded resilient washer assembly
112 radially outer surface, inner ring
114 groove
116 radially inner surface, outer ring
118 groove
120 groove
122 resilient washer
124 washer
126 radially outermost surface, resilient washer
130 resilient finger
131 notch
132 distal end, resilient finger
134 indentation
136 tab
138 surface segment, resilient washer
140 radially innermost segment, washer
142 surface segment, washer
144 annular surface, washer
146 radially outermost surface, washer
148 radially outer surface, outer ring
150 radially outer portion, washer
200 bearing assembly
202 housing
204 shaft
206 wall, housing

The invention claimed is:
1. A bearing, comprising:
an inner ring defining a first groove;
an outer ring including a radially inner surface, the radially inner surface facing an axis of rotation of the bearing and defining:
a second groove; and,
a third groove;
a cage radially disposed between the inner ring and the outer ring;
a plurality of balls retained by the cage, and disposed in the first groove, and in the second groove; and,
a preloaded resilient washer assembly including:
a resilient washer including a radially outermost surface disposed in the third groove; and,
a washer directly connected to the resilient washer.
2. The bearing of claim 1, wherein the resilient washer urges the washer away from the outer ring in an axial direction parallel to an axis of rotation of the bearing.
3. The bearing of claim 1, wherein the radially outermost surface of the resilient washer is circumferentially continuous.
4. The bearing of claim 1, wherein the resilient washer includes a plurality of resilient fingers extending radially inwardly.
5. The bearing of claim 4, wherein:
an axial direction is from the washer to the balls; and,
the plurality of resilient fingers is slanted in the axial direction along a radially outer direction, orthogonal to the axis of rotation of the bearing.

6. The bearing of claim 4, wherein the washer includes a radially innermost segment in contact with at least two resilient fingers included in the plurality of resilient fingers.
7. The bearing of claim 1, wherein:
the resilient washer includes a radially innermost surface defining at least one radially outwardly extending indentation;
the washer includes at least one axially extending tab disposed in the at least one radially outwardly extending indentation; and,
the washer is non-rotatably connected to the resilient washer by the at least one axially extending tab.
8. The bearing of claim 1, wherein the radially outermost surface of the resilient washer is axially displaceable with respect to the washer.
9. The bearing of claim 1, wherein:
the washer includes an annular, planar surface:
facing in a first axial direction parallel to an axis of rotation of the bearing; and,
arranged to contact a housing of a bearing assembly; and,
the resilient washer is arranged to react against the washer to urge the outer ring away from the annular, planar surface.
10. The bearing of claim 1, wherein:
the resilient washer includes a radially outermost surface; and,
the washer includes a radially outermost surface radially outward of the radially outermost surface of the resilient washer.
11. The bearing of claim 1, wherein the washer is free of contact with the inner ring and the outer ring.
12. A bearing, comprising:
an inner ring defining a first groove;
an outer ring including a radially inner surface, the radially inner surface facing an axis of rotation of the bearing and defining:
a second groove; and,
a third groove;
a cage radially disposed between the inner ring and the outer ring;
a plurality of balls retained by the cage, and disposed in the first groove, and in the second groove; and,
a preloaded resilient washer assembly including:
a rigid washer; and,
a resilient washer including a radially outermost surface disposed in the third groove, the resilient washer urging the rigid washer away from the outer ring in an axial direction parallel to an axis of rotation of the bearing.
13. The bearing of claim 12, wherein the resilient washer includes a plurality of resilient fingers extending radially inwardly.
14. The bearing of claim 13, wherein the rigid washer includes a radially innermost segment in contact with at least two resilient fingers included in the plurality of resilient fingers.
15. The bearing of claim 12, wherein:
the resilient washer includes a radially innermost surface defining at least one radially outwardly extending indentation;
the rigid washer includes at least one axially extending tab disposed in the at least one radially outwardly extending indentation; and,
the rigid washer is non-rotatably connected to the resilient washer by the at least one axially extending tab.

16. The bearing of claim 12, wherein the rigid washer is free of contact with the inner ring and the outer ring.

17. The bearing of claim 12, wherein the radially outermost surface of the resilient washer is axially displaceable with respect to the rigid washer.

18. A method of preloading a bearing assembly, the bearing assembly including a housing, a bearing enclosed by the housing, the bearing including an inner ring defining a first groove and connected to a shaft, an outer ring connected to the housing and including a radially inner surface defining a second groove and a third groove, a cage radially disposed between the inner ring and the outer ring, a plurality of balls retained by the cage and disposed in the first groove and in the second groove, and a preloaded resilient washer assembly with a resilient washer including a radially outermost surface disposed in the third groove and a washer directly connected to the resilient washer and in contact with the housing, the method comprising:

urging, with the resilient washer, in a first axial direction parallel to an axis of rotation of the bearing, and with a first force, the outer ring away from the washer and the housing, and into contact with the plurality of balls;

rotating the shaft and the inner ring, with respect to the housing, in a circumferential direction around an axis of rotation of the bearing; and, displacing, with a second force, the outer ring in the first axial direction, and maintaining, with the preloaded resilient washer assembly, the contact of the outer ring with the plurality of balls; or, displacing, with a second force, the outer ring in a second axial direction, opposite the first axial direction, and maintaining, with the preloaded resilient washer assembly, the contact of the outer ring with the plurality of balls.

19. The method of claim 18, wherein maintaining, with the preloaded resilient washer assembly, the contact of the outer ring with the plurality of balls includes:

expanding the resilient washer when displacing, with the second force, the outer ring in the first axial direction; or, compressing the resilient washer when displacing, with the second force, the outer ring in the second axial direction.

20. The method of claim 19, wherein compressing the resilient washer when displacing, with the second force, the outer ring in the second axial direction includes preventing contact between the washer and the outer ring.

\* \* \* \* \*